United States Patent
Matsunobu et al.

(10) Patent No.: US 8,716,878 B2
(45) Date of Patent: May 6, 2014

(54) DOWNWIND TYPE WIND TURBINE HAVING TRANSFORMER THEREIN AND OPERATING METHOD THEREOF

(75) Inventors: Takashi Matsunobu, Tsuchiura (JP); Mitsuru Saeki, Hitachinaka (JP); Tsutomu Hasegawa, Hitachi (JP); Hiroshi Kato, Utsunomiya (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 13/210,548

(22) Filed: Aug. 16, 2011

(65) Prior Publication Data

US 2012/0057976 A1   Mar. 8, 2012

(30) Foreign Application Priority Data

Sep. 6, 2010   (JP) ................................. 2010-198443

(51) Int. Cl.
   *F03D 9/00*  (2006.01)
(52) U.S. Cl.
   USPC .............................................. 290/44; 290/55
(58) Field of Classification Search
   USPC ................................................... 290/44, 55
   See application file for complete search history.

(56) References Cited

U.S. PATENT DOCUMENTS

| | | | |
|---|---|---|---|
| 7,109,600 B1 | 9/2006 | Bywaters et al. | |
| 7,365,447 B2 * | 4/2008 | Yoshida | 290/55 |
| 2009/0200804 A1 * | 8/2009 | Nielsen et al. | 290/44 |
| 2010/0007150 A1 * | 1/2010 | Ciszak et al. | 290/55 |

FOREIGN PATENT DOCUMENTS

| | | |
|---|---|---|
| EP | 1 821 382 A2 | 8/2007 |
| JP | 59-147879 A | 8/1984 |
| JP | 2003-148324 | 5/2003 |
| JP | 2003-338418 | 11/2003 |
| JP | 2006-9596 A | 1/2006 |
| JP | 2006-152898 | 6/2006 |
| JP | 2008-232108 A | 10/2008 |
| JP | 2010-136515 | 6/2010 |
| WO | WO 2010/031575 A2 | 3/2010 |

OTHER PUBLICATIONS

Australian Office Action dated Apr. 11, 2012 (Three (3) pages).
Korean Office Action dated Apr. 25, 2013 with English translation (six (6) pages).
Japanese Office Action dated Apr. 16, 2013 (4 pages) with English translation (3 pages).
Taiwanese Office Action dated Feb. 6, 2014 (Six (6) pages).

* cited by examiner

*Primary Examiner* — Tho D Ta
(74) *Attorney, Agent, or Firm* — Crowell & Moring LLP

(57) ABSTRACT

A downwind type wind turbine having a transformer stored in a support post or in a nacelle includes the nacelle which supports a rotor and stores therein a generator, a support post which supports the nacelle and a main transformer disposed between the generator and an electric power system and the main transformer is stored in the nacelle or in the support post.

11 Claims, 5 Drawing Sheets

DOWNWIND TYPE WIND TURBINE HAVING TRANSFORMER THEREIN AND OPERATING METHOD THEREOF

BACKGROUND OF THE INVENTION

The present invention relates to a downwind type wind turbine which generates electricity in the state that a rotor is disposed downwind and more particularly to a downwind type wind turbine in which disposition of a transformer constituting substation or transformation equipment is improved.

Wind power generation is known as renewable energy together with photovoltaic generation and its need is enhanced from the point of view of reduction of $CO_2$, so that installation of wind turbines is advanced rapidly. Horizontal-axis wind turbines are divided broadly into upwind type wind turbines having rotor disposed upwind and downwind type wind turbines having rotor disposed downwind according to arrangement of rotor in the direction of wind. Most of wind turbines installed for wind power generation are upwind type wind turbines.

As described above, although the upwind type wind turbines are mainstream currently, when the rotation surface of rotor of the upwind type wind turbine is to be arranged perpendicularly to blowing-up wind in mountain regions or on the sea where blowing-up wind from the underside of wind turbine is increased, the rotor collides with a support post supporting the wind turbine due to its shape and accordingly the rotation surface of rotor cannot be arranged perpendicularly to blowing-up wind. As a result, energy of wind cannot be used for rotation of rotor effectively and the generation efficiency of electricity is reduced.

On the other hand, in case of the downwind type wind turbine, since electricity is generated in the state that rotor is disposed downwind, the rotor does not collide with the support post even if the rotation surface of rotor is arranged perpendicularly to blowing-up wind, so that energy of wind can be used for generation of electricity efficiently as compared with the upwind type wind turbine and so the downwind type wind turbine has precedence. Accordingly, installation of downwind type wind turbines is desired on the sea or in mountain regions, for example, where blowing-up wind is superior.

However, only a limited installation space of wind turbine is available in the mountain regions or on the sea described above in the first place and to be able to install the wind turbine it would be necessary to make it possible to install the wind turbine even in a reduced space. As a measure of reducing the space concretely, it is conceivable to dispense with a building for storing the transformer therein, which is usually individually set up outside the wind turbine.

Generally, a well-known technique that transformer is stored inside the wind turbine to save space is described in JP-A-2006-9596, for example. In the technique described in JP-A-2006-9596, a storage room is provided in a support post and substation/switching equipment composed of transformer and switching apparatus is provided in the storage room.

SUMMARY OF THE INVENTION

However, although the technique per se of storing a transformer in the support post or nacelle is generally publicly known, as seen for example from the wind turbine described in JP-A-2006-9596, no known technique exists which makes mention of storing a transformer in the support post or nacelle that is a load room for a power generator or the like, in downwind type wind turbines that are suited to be installed in mountain regions where installation space is very limited or on the sea, for example. This is attributable to the fact that the mainstream of the existing wind turbine is the upwind type wind turbine in the first place and accordingly there is no recognition about the problems peculiar to the downwind type wind turbine.

Further, since the upwind type wind turbine generates electricity in the state that the rotor is positioned on the windward side from the nacelle or support post, influence of the size of the nacelle or support post on the generation efficiency of electricity is small, whereas since the downwind type wind turbine generates electricity in the state that the rotor is positioned downwind from the nacelle or support post, it is desirable that the area of the nacelle or support post is reduced to the smallest possible degree in order to increase the generation efficiency of electricity. If a large transformer is to be stored in the nacelle or support post, the area or size of the nacelle or support post would be normally increased and thus the generation efficiency of electricity would be reduced. Thus, it has been never required for the downwind type wind turbine to take the trouble of storing the transformer in the nacelle or support post and hence the downwind type wind turbine and the upwind type wind turbine need to be discussed differently or separately. Thus, in the downwind type wind turbine, there has been no technical idea of storing the transformer in the nacelle or support post and it was difficult to install the downwind type wind turbine in a limited installation space.

It is an object of the present invention to provide a downwind type wind turbine capable of being installed in limited installation space in view of its new problem discussed above.

The downwind type wind turbine according to the present invention comprises a nacelle to support the rotor and store therein a power generator, a support post to support the nacelle and a main transformer arranged between the generator and an electric power system, and the main transformer is stored in the nacelle or the support post.

According to the present invention, there can be provided a downwind type wind turbine capable of being installed in a limited installation space.

Other objects, features and advantages of the invention will become apparent from the following description of the embodiments of the invention taken in conjunction with the accompanying drawings.

DESCRIPTION OF THE EMBODIMENTS

Embodiments of the present invention are now described with reference to the accompanying drawings.

Embodiment 1

Figure 1:
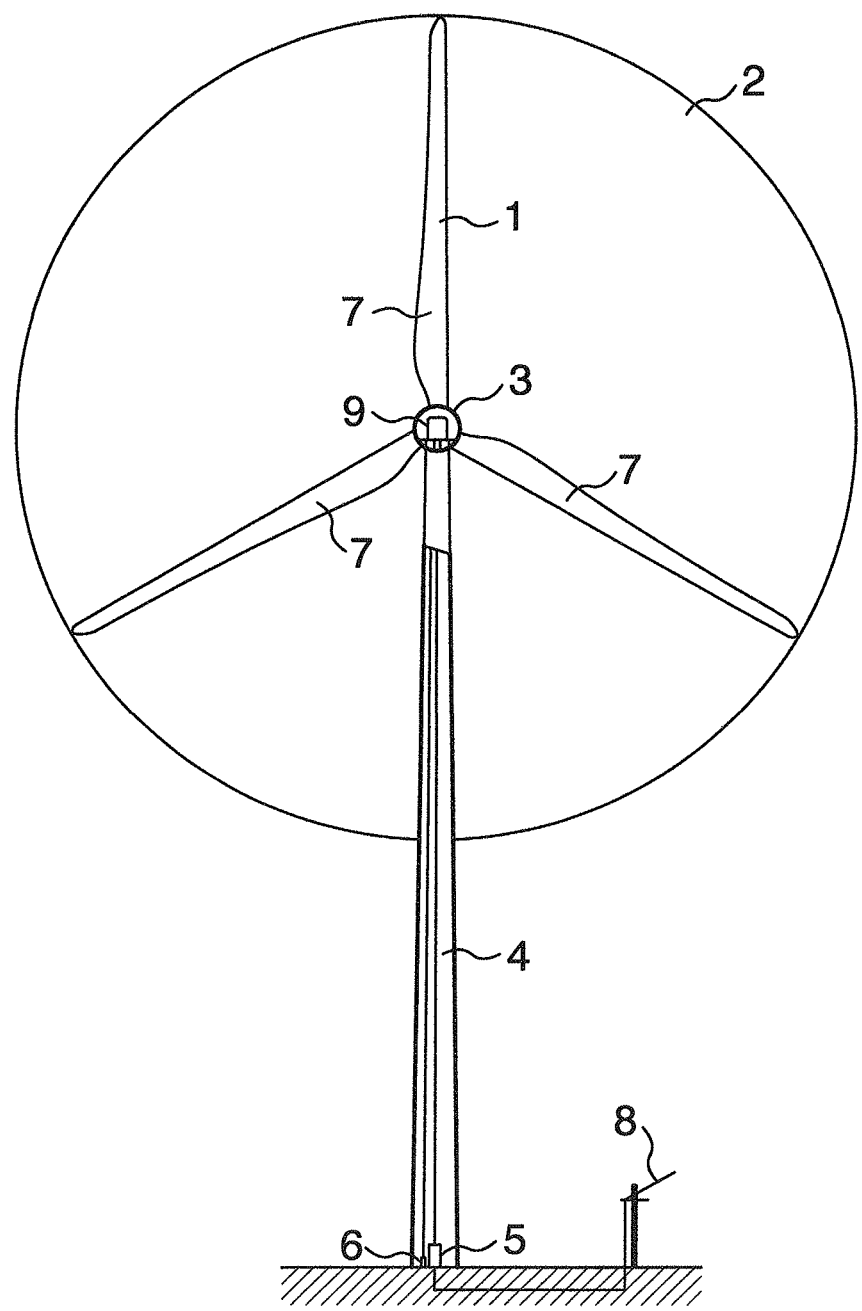
FIG. 1 illustrates a downwind type wind turbine according to embodiment 1 of the present invention as viewed from upwind.
Figure 2:
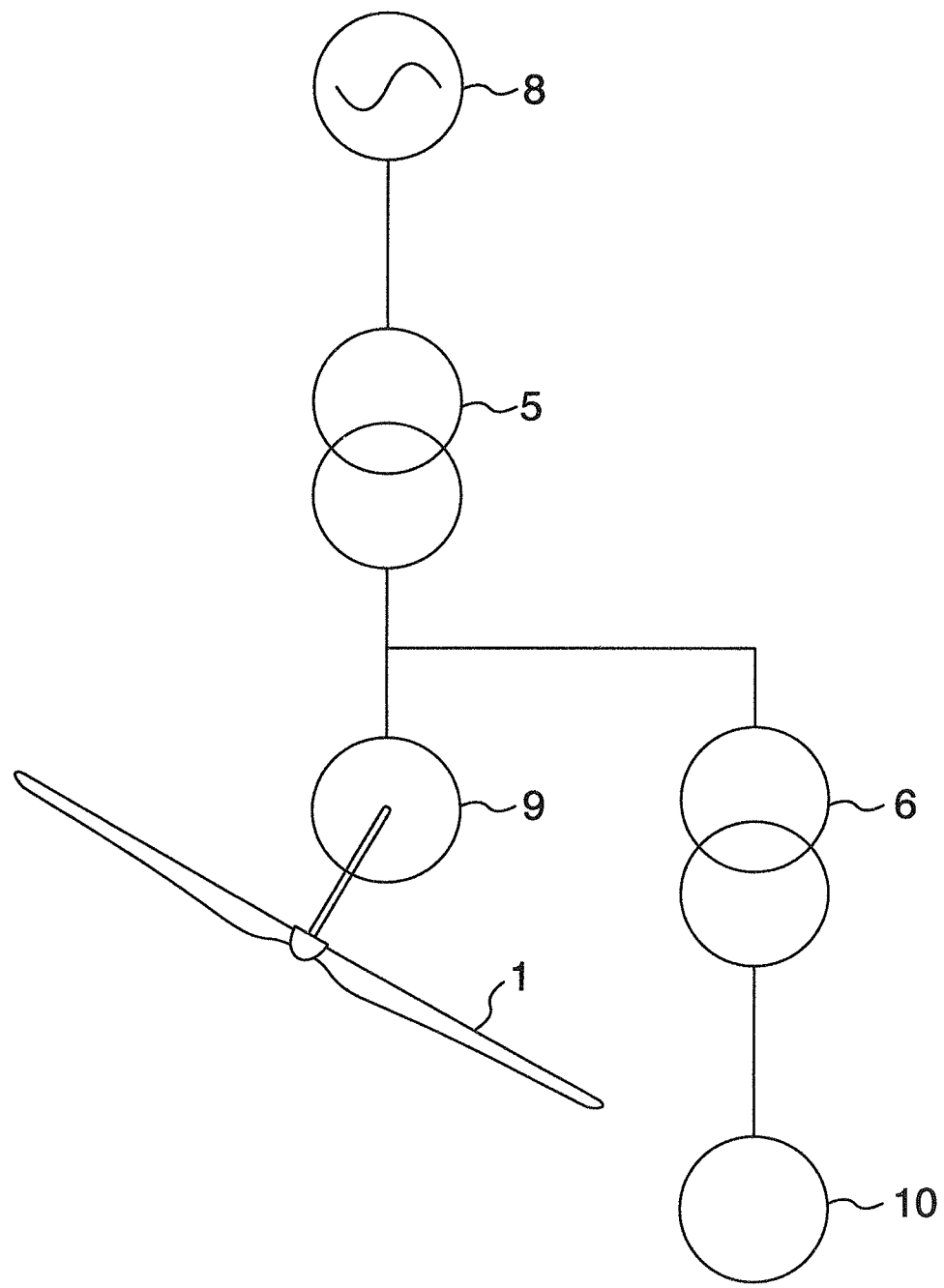
FIG. 2 is a single-line diagram of the downwind type wind turbine according to embodiment 1 and its electric power system.
Figure 3:
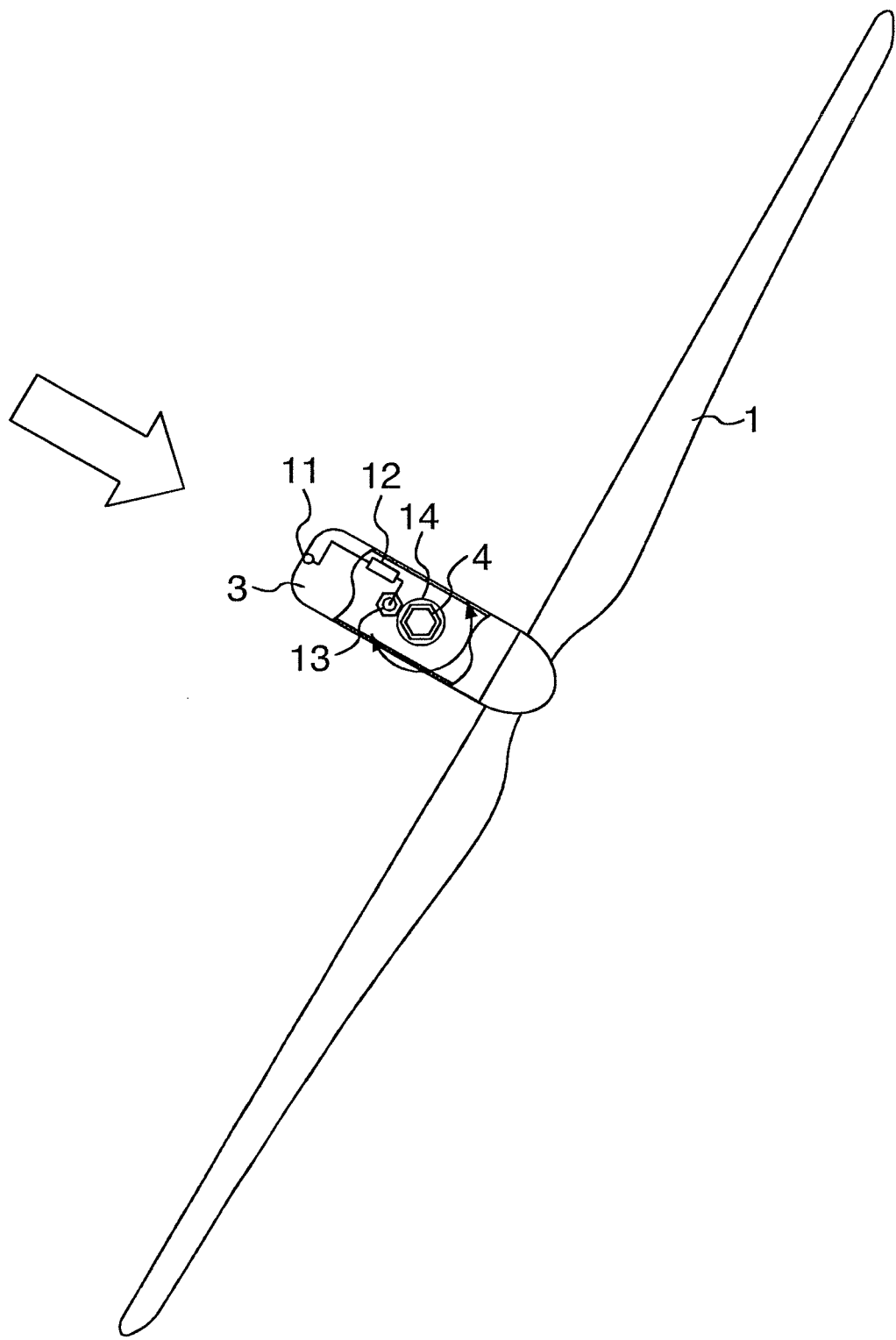
FIG. 3 illustrates the inside of a nacelle in embodiment 1.

Referring now to FIGS. 1 to 3, embodiment 1 is described. As shown in FIG. 1, a downwind type wind turbine according to the embodiment includes a rotor 1 composed of 3 blades 7 which are rotated by catching wind and a hub (not shown), a nacelle 3 which supports the rotor 1 and in which a power generator 9 described later, a controller and the like are stored and a support post 4 which supports the nacelle 3.

As shown in FIG. 3, the nacelle 3 stores therein the generator 9 connected to the rotor 1 to generate electricity by driving the rotator by rotation of the rotor 1, a gear 14 connected to the support post 4, a yaw driving device 13 meshed or engaged with the gear 14 to yaw the rotor 1 vertically to the support post 4, a yaw controller 12 for controlling to drive the yaw driving device 13 and a wind vane and anemometer 11 to measure the direction and the velocity of wind to send measured data to the yaw controller 12.

As shown in FIGS. 1 and 2, a main transformer 5 disposed between the generator 9 and an electric power system 8 disposed outside the wind turbine to boost voltage of generated power which is a medium voltage to be converted into a system voltage which is a high voltage and an auxiliary transformer 6 which is supplied with part of the generated power of the generator 9, reduces it to a low voltage and supplies electric power to an auxiliary machinery (or auxiliary equipment) 10 such as the above-mentioned wind vane and anemometer 11 and yaw controller 12 in the nacelle 3 are disposed in a lower part of the support post 4. The auxiliary machinery 10 is a controller which performs control of the wind turbine including control of pitch angle of blades and rotation angle in horizontal direction of blades in accordance with direction and velocity of wind. Power cable is used to transport electric power from the generator 9 to the side of the electric power system 8 and magnetic shield is disposed around the power cable to prevent power noise from leaking peripherally. Furthermore, an optical fiber cable (not shown) is used for transmission of control signal in the auxiliary machinery 10, so that the rotor 1 is prevented from being operated improperly due to mixing of power noise. In addition, the main transformer 5 and the auxiliary transformer 6 use amorphous transformers from the point of view to increase the cooling efficiency. Since the main transformer 5 and the auxiliary transformer 6 are heavy in weight, they are disposed in a lower part of the support post to improve the stability of the wind turbine.

FIG. 2 is a single-line diagram of the embodiment. In the embodiment, electric power generated by the power generator 9 is boosted by the main transformer 5 installed in the support post 4 to be conveyed to the side of the electric power system 8 disposed outside the wind turbine.

Referring now to FIG. 3, a method of controlling yawing of the nacelle and pitch angle of the blades 7 will be explained. When generation of electricity is performed normally, the yaw controller 12 is supplied with electric power from the auxiliary transformer 6 and controls the yaw driving device 13 so that the rotation surface 2 of the rotor 1 is turned perpendicularly to the direction of wind detected by the wind vane and anemometer 11 downwind. In this manner, the direction of wind (indicated by the arrow shown) is detected to control the rotation surface 2 of the rotor 1 in accordance with the direction of wind, so that kinetic energy of wind can be obtained sufficiently.

On the other hand, in the unusual state such as the case where vibration of the nacelle 3 is increased, the case where the velocity of wind is larger than a prescribed value, the case where the anemometer has broken down, the case where the generator 9 is in excessively rotated state and the like, it is necessary to stop rotation of the rotor 1 in view of the stability of the wind turbine. In such cases, the pitch angle of each of the blades 7 constituting the rotor 1 is adjusted to control the blades 7 so that each of the blades 7 is set in parallel with the direction of wind. Such control is also performed by the auxiliary machinery 10 and electric power supplied thereto is supplied from the auxiliary transformer 6. The blades 7 are prevented from receiving lift from wind by such control, so that the rotor 1 stops its rotation.

When the above unusual state is dissolved and rotation of the rotor 1 is resumed, it is necessary to control the blades 7 by the auxiliary machinery 10 so that the pitch angle of the blades 7 is adjusted to receive lift from wind, although the generator 9 is not operated and accordingly electric power for operating the auxiliary machinery 10 cannot be received from the generator 9.

Accordingly, at the time of resumption of rotation, electric power for operating the auxiliary machinery 10 is supplied from the electric power system 8 through the main transformer 5. Electric power is supplied from the electric power system 8 and the pitch angle of the blades 7 is adjusted to receive lift from wind, so that the rotor 1 resumes rotation and the generation of electricity is performed again.

In the operation mode of the embodiment, electric power generated by the generator 9 is applied to the auxiliary transformer 6 directly and its voltage is decreased by the auxiliary transformer 6 to be supplied to the auxiliary machinery 10 such as the wind vane and anemometer 11 and the yaw controller 12. In this manner, electric power which is applied to the auxiliary transformer 6 to be supplied to the auxiliary machinery 10 is directly received from the generator 9 instead of high-voltage system side, so that since high-voltage parts in the support post are reduced and insulation from the support post wall is ensured, so that distance between power cable or auxiliary machinery 10 and the support post wall can be shortened. In the downwind type wind turbine, the larger the diameter of the support post is, the smaller the quantity of wind striking the rotor 1 is, so that the generation efficiency is reduced and accordingly it is particularly advantageous to the downwind type wind turbine that the support post can store therein the transformers without making the diameter of the support post larger if possible from the point of view not to reduce the generation efficiency of electricity.

In the upwind type wind turbine, at the time of power failure that the generator 9 and the electric power system 8 are stopped simultaneously due to some cause when electric power is supplied from the generator 9 to the auxiliary machinery 10, supply of electric power to the auxiliary machinery 10 is cut off. In this case, even if the pitch angle can be controlled, control in yaw driving direction of nacelle 3 cannot be continued. When wind is received from the perpendicular direction to the axis of the rotor 1 in the state that control by yaw driving mechanism is impossible, wind load exceeding design load is produced, so that there is a possibility that breakdown of yaw mechanism, falling down of wind turbine or the like occurs so that the stability of wind turbine cannot be maintained. Accordingly, it is necessary to provide a power supply for backup from the point of view to ensure the stability. Even in such case, since the downwind type wind turbine is supposed to generate electricity in the state that the rotor 1 is positioned downwind in the first place, the rotor 1 can be automatically positioned downwind and the stability as the whole wind turbine can be maintained at least even if yaw driving control is impossible so that the very optimization of yaw driving is impossible. Therefore, the power supply for backup to ensure the stability is not required and it is possible to make contribution to realization of space saving. Even as compared with the case where, for example, electricity is generated as the upwind type wind turbine but the upwind type wind turbine has function of being changed over to the downwind type wind turbine only when generation of electricity is stopped, the downwind type wind turbine of the embodiment is always operated as the downwind type wind turbine and accordingly it is not necessary to add special structure for change over, so that there can be attained various effects such as simplification of mechanism, reduction of cost and prevention of reduction in generation efficiency of electricity due to addition of unnecessary mechanism.

Further, as described above in the prior art, since the downwind type wind turbine generates electricity in the state that the rotor 1 is positioned downwind, the rotor 1 does not collide with the support post even if the rotation surface of the rotor 1 is arranged perpendicularly to blowing-up wind and energy of wind can be used for generation of electricity efficiently as compared with the upwind type wind turbine, so that the downwind type wind turbine has precedence.

In the downwind type wind turbine of the embodiment, since the main transformer 5 and the auxiliary transformer 6 are stored in the support post 4, it is not necessary to dispose the building for transformer outside the downwind type wind turbine, so that the downwind type wind turbine can be installed even in a limited installation space. More concretely, land preparation work of building site for the downwind type wind turbine can be reduced and installation is easy. Furthermore, since high-voltage part connected to the electric power system 8 of the main transformer 5 and the auxiliary transformer 6 of the downwind type wind turbine can be installed in the downwind type wind turbine, a protective fence for protecting the high-voltage part connected to the electric power system 8 of the main transformer 5 and the auxiliary transformer 6 is not required to be installed outside the downwind type wind turbine separately and there can be attained effects such as further realization of space saving, reduction of cost and improved stability that the high-voltage part is not exposed. Further, in the embodiment, both of the main transformer 5 and the auxiliary transformer 6 are stored in the support post 4, although if at least any of them is stored in the support post, installation space can be reduced. Particularly, the case where the main transformer 5 is stored in the downwind type wind turbine is more effective from the point of view of reduction of installation space.

Embodiment 2

Figure 4:
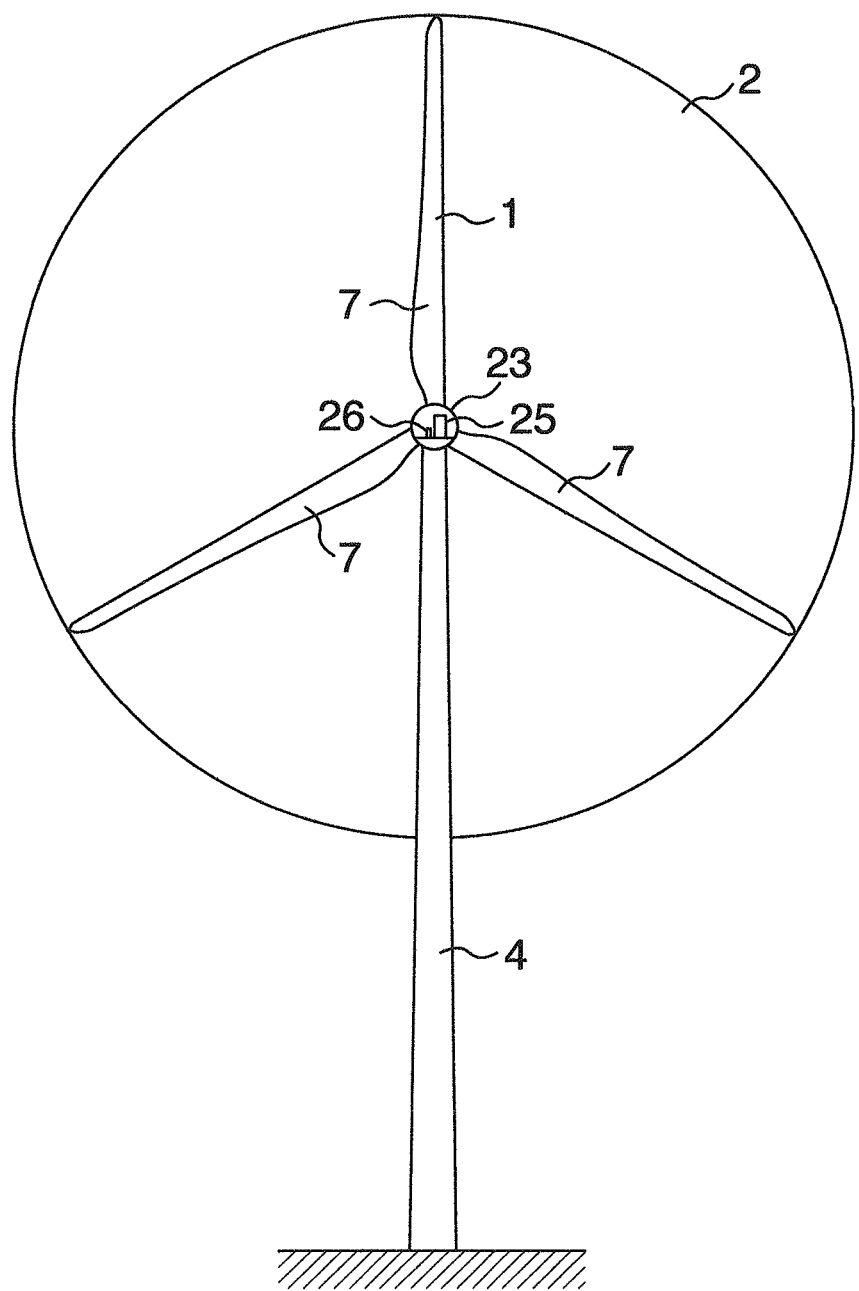
FIG. 4 illustrates a downwind type wind turbine according to embodiment 2 of the present invention as viewed from upwind.

Referring now to FIG. 4, an embodiment 2 is described. In the embodiment 1, the main transformer 5 and the auxiliary transformer 6 are stored in the support post 4, although as shown in FIG. 4 the main transformer 25 and the auxiliary transformer 26 may be stored in nacelle 23. When expressed by a single-line diagram, the fact that both the transformers are stored in the wind turbine is the same although there is a difference in that transformer is stored in the support post 4 or nacelle 23 and accordingly description of single-line connection is omitted.

In the downwind type wind turbine of the embodiment, since the main transformer 25 and the auxiliary transformer 26 are stored in the nacelle 23, it is not necessary to set up a building for transformer outside the downwind type wind turbine and the downwind type wind turbine can be installed even in limited installation space. More concretely, land-preparation work of building site for the downwind type wind turbine can be reduced and installation is easy. Furthermore, since high-voltage part connected to the electric power system 8 of the main transformer 25 and the auxiliary transformer 26 of the downwind type wind turbine can be installed in the downwind type wind turbine, a protective fence for protecting the high-voltage part connected to the electric power system 8 of the main transformer 5 and the auxiliary transformer 6 is not required to be installed outside of the downwind type wind turbine separately and there can be attained effects such as further realization of space saving, reduction of cost and improved stability that the high-voltage part is not exposed.

Moreover, installation space can be reduced by storing at least any of the main transformer 25 and the auxiliary transformer 26 in the wind turbine and the freedom degree of design that any one of them is stored in the support post and the other is stored in the nacelle is also allowed in combination with the embodiment 1. Particularly, the case where the main transformer 25 which is larger than the auxiliary transformer 26 is stored in the downwind type wind turbine is more effective from the point of view of reduction of installation space.

Embodiment 3

Figure 5:
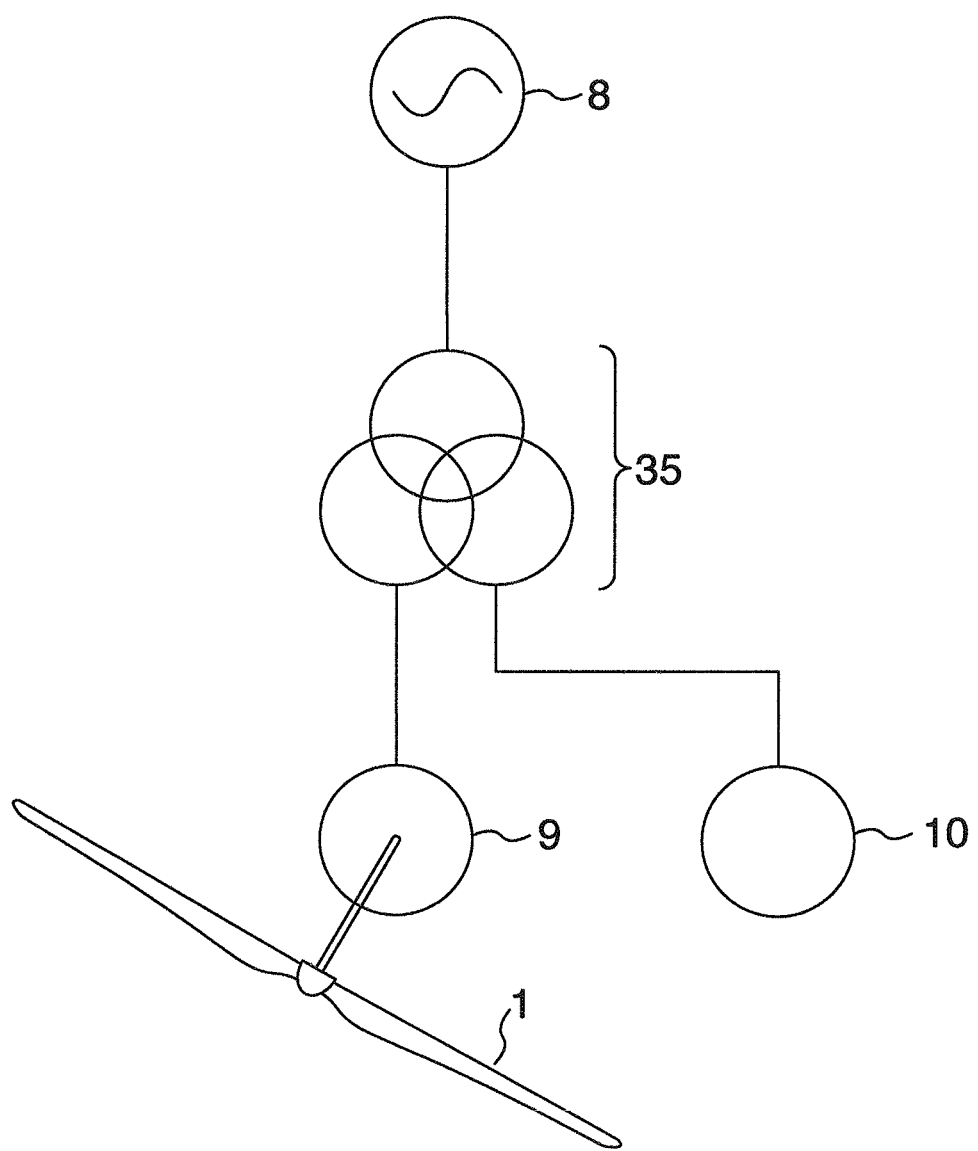
FIG. 5 is a single-line diagram of a downwind type wind turbine according to embodiment 3 and its electric power system.

Referring now to FIG. 5, an embodiment 3 is described. In the aforementioned embodiments, the main transformer and the auxiliary transformer are separated, although in this embodiment the function of both the transformers is attained by a single transformer. That is, one coil is added to a main transformer 35 stored in the support post 4 to attain 3-winding structure, so that electric power of low voltage is produced from the main transformer 35. With such structure, auxiliary transformer can be also omitted, so that installation space is reduced all the more. In the embodiment, the main transformer 35 is installed in the support post 4, although it may be installed in the nacelle.

It should be further understood by those skilled in the art that although the foregoing description has been made on embodiments of the invention, the invention is not limited thereto and various changes and modifications may be made without departing from the scope of the invention and the scope of the appended claims.

The invention claimed is:

1. A downwind type wind turbine, comprising:
    a rotor,
    a nacelle to support the rotor and store therein a generator,
    a support post to support the nacelle,
    a main transformer arranged between the generator and an electric power system, and
    an auxiliary transformer arranged between the generator and an auxiliary machinery,
    wherein the main transformer and the auxiliary transformer are stored at the same level in the nacelle or in the support post,
    wherein the rotor includes blades disposed downwind relative to the nacelle and the support post when the downwind type wind turbine generates electricity, and
    wherein power from the generator is conveyable to the main and auxiliary transformers.

2. A downwind type wind turbine according to claim 1, wherein the auxiliary transformer is connected to a generator side of the main transformer.

3. A downwind type wind turbine according to claim 1, wherein at least one of the main transformer and the auxiliary transformer is disposed at bottom of the support post.

4. A downwind type wind turbine according to claim 1, wherein at least one of the main transformer and the auxiliary transformer is an amorphous transformer.

5. A downwind type wind turbine according to claim 1, wherein the auxiliary transformer is stored in the nacelle or in the support post.

6. A downwind type wind turbine according to claim 5, wherein in the nacelle and the support post, an optical fiber cable is used for measured value and control signal transmission, and a magnetic shield is disposed around an electrical signal or current flow location.

7. A method of operating a downwind type wind turbine, including a main transformer stored in a support post or in a nacelle, comprising:
 disposing blades of a rotor downwind relative to the support post and the nacelle when the turbine generates electricity, as well as between a generator stored in the nacelle, an electric power system, a main transformer arranged between the generator and the electric power system, and an auxiliary transformer arranged between the generator and an auxiliary machinery and stored at the same level in the support post or the nacelle as the main transformer,
 controlling the downwind type wind turbine with the auxiliary machinery, which is connected to the generator,
 operating the auxiliary machinery by electric power generated by the generator so as to control the downwind type wind turbine, and
 conveying power from the generator to the main transformer, the auxiliary transformer, or both the main transformer and the auxiliary transformer.

8. A method of operating a downwind type wind turbine according to claim 7, wherein, during generation of electricity by the downwind type wind turbine, electric power generated by the generator is transformed by the auxiliary transformer to operate the auxiliary machinery so as to control the downwind type wind turbine.

9. A method of operating a downwind type wind turbine according to claim 7, wherein, during generation of electricity by the downwind type wind turbine, electric power generated by the generator is transformed by the auxiliary transformer in the support post or in the nacelle to operate the auxiliary machinery so as to control the downwind type wind turbine.

10. A downwind type wind turbine according to claim 7, wherein the downwind type wind turbine stops generation of electricity in an unusual state, and when the unusual state is solved thereafter, the auxiliary machinery is operated by electric power supplied from a system side through the main transformer so as to control the downwind type wind turbine.

11. A method of operating a downwind type wind turbine according to claim 7, wherein at a time of power failure of the generator and the electric power system, the rotor is positioned downwind without performing a yaw control by the auxiliary machinery.

* * * * *